(12) United States Patent
Ahn

(10) Patent No.: US 9,585,219 B2
(45) Date of Patent: Feb. 28, 2017

(54) LIGHT EMITTING ELEMENT DRIVING APPARATUS

(71) Applicant: Dongbu Hitek Co., Ltd., Gyeonggi-do (KR)

(72) Inventor: Young Kook Ahn, Gyeonggi-do (KR)

(73) Assignee: Dongbu Hitek Co., Ltd. (KR)

( * ) Notice: Subject to any disclaimer, the term of this patent is extended or adjusted under 35 U.S.C. 154(b) by 0 days.

(21) Appl. No.: 14/951,596

(22) Filed: Nov. 25, 2015

(65) Prior Publication Data

US 2016/0262233 A1    Sep. 8, 2016

(30) Foreign Application Priority Data

Mar. 4, 2015  (KR) .......................... 10-2015-0030137

(51) Int. Cl.
*H05B 33/08* (2006.01)

(52) U.S. Cl.
CPC ...... *H05B 33/0845* (2013.01); *H05B 33/0812* (2013.01); *H05B 33/0824* (2013.01); *H05B 33/0851* (2013.01)

(58) Field of Classification Search
CPC ............ H05B 33/0803; H05B 33/0896; H05B 37/036; H05B 39/06; H05B 33/0806; H05B 33/0809; H05B 33/0812; H05B 33/0815; H05B 33/0845
See application file for complete search history.

(56) References Cited

U.S. PATENT DOCUMENTS

| 7,750,617 | B2 * | 7/2010 | Omi ...................... | H02M 3/156 |
| | | | | 323/285 |
| 8,664,870 | B2 * | 3/2014 | Su ...................... | H05B 33/0812 |
| | | | | 315/185 R |
| 9,055,645 | B2 * | 6/2015 | Kwon ................ | H05B 33/0809 |
| 9,173,265 | B2 * | 10/2015 | Park ................ | H05B 33/0851 |
| 9,204,517 | B2 * | 12/2015 | Hong ................ | H05B 33/0887 |
| 2013/0026924 | A1 * | 1/2013 | Jong ................ | H05B 33/0818 |
| | | | | 315/113 |
| 2015/0305098 | A1 * | 10/2015 | Jung ................ | H05B 33/0824 |
| | | | | 315/122 |

FOREIGN PATENT DOCUMENTS

WO    WO 2014104776 A1 *  7/2014   ......... H05B 33/0824

* cited by examiner

*Primary Examiner* — Vibol Tan
(74) *Attorney, Agent, or Firm* — Patterson Thuente Pederson, P.A.

(57) ABSTRACT

Disclosed herein is a light emitting element driving apparatus for controlling a light emitting unit including serially connected light emitting element arrays. The apparatus includes a rectifying unit configured to provide a rectified signal to the light emitting unit according to a result of rectifying an alternating current (AC) signal, a switching unit configured to selectively connect output terminals of the light emitting element arrays to a first node, an amplifying unit configured to amplify each of reference voltages having different levels and a voltage of a second node and to generate first amplified signals controlling the switching unit according to an amplification result, a sensing resistor connected between the second node and an electrical ground, and a current sensing circuit configured to generate mirrored current by mirroring current supplied from the first node and to provide the mirrored current to the second node.

10 Claims, 9 Drawing Sheets

FIG.3

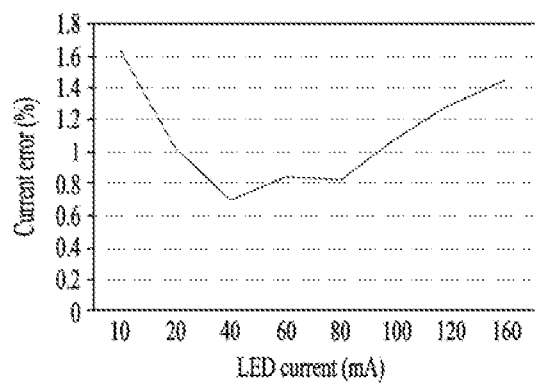

FIG.4

| Condition | LED Current (=$I_{IN}$) |
|---|---|
| $V_{IN} < V_{LED1}$ | 0 |
| First Interval: $V_{LED1} \leq V_{IN} < (V_{LED1}+V_{LED2})$ | $I_{LED1} = V_{REF1} \times \dfrac{K}{R_{SENSE}}$ |
| Second Interval: $(V_{LED1}+V_{LED2}) \leq V_{IN} < (V_{LED1}+V_{LED2}+V_{LED3})$ | $I_{LED2} = V_{REF2} \times \dfrac{K}{R_{SENSE}}$ |
| Third Interval: $(V_{LED1}+V_{LED2}+V_{LED3}) \leq V_{IN} < (V_{LED1}+V_{LED2}+V_{LED3}+V_{LED4})$ | $I_{LED3} = V_{REF3} \times \dfrac{K}{R_{SENSE}}$ |
| Fourth Interval: $V_{LED1}+V_{LED2}+V_{LED3}+V_{LED4} \leq V_{IN}$ | $I_{LED4} = V_{REF4} \times \dfrac{K}{R_{SENSE}}$ |

|  | PF(%) | THD(%) | Percent Flicker(%) | Flicker Index(%) |
|---|---|---|---|---|
| CASE 2 | 99.56 | 9.6 | 99.99 | 0.32 |
| CASE 3 | 95.01 | 31.04 | 59.74 | 0.25 |
| Embodiment | 97.06 | 25.03 | 59.74 | 0.25 |

LIGHT EMITTING ELEMENT DRIVING APPARATUS

This application claims the benefit of Korean Patent Application No. 10-2015-0030137, filed on Mar. 4, 2015, which is hereby incorporated by reference as if fully set forth herein.

BACKGROUND OF THE INVENTION

Field of the Invention

Embodiments relate to a light emitting element driving apparatus.

Discussion of the Related Art

Thanks to advances in semiconductor technology, efficiency of a light emitting diode (LED) has been remarkably improved. The LED is environmentally friendly as well as economical because the LED has a longer lifespan and consumes less energy than an existing illumination device such as an incandescent lamp or a fluorescent lamp. Due to these advantages, the LED is attracting attention as a light source to replace a traffic light, a backlight of a flat panel display device such as a light crystal display (LCD), or the like.

When LEDs are used as a lighting device, the LEDs are connected in series or in parallel and are turned on and off by a light emitting element control device.

As such, the light emitting element control device controlling a plurality of LEDs generally rectifies an alternating current (AC) voltage and causes the LEDs to be turned on and off by the rectified ripple voltage.

SUMMARY OF THE INVENTION

Accordingly, the present invention is directed to a light emitting element driving apparatus that substantially obviates one or more problems due to limitations and disadvantages of the related art.

An object of embodiments is to provide a light emitting element driving apparatus which is capable of reducing power consumed in a sensing resistor and improving a power factor and total harmonic distortion.

Additional advantages, objects, and features of the embodiments will be set forth in part in the description which follows and in part will become apparent to those having ordinary skill in the art upon examination of the following or may be learned from practice of the invention.

The objectives and other advantages of the embodiments may be realized and attained by the structure particularly pointed out in the written description and claims hereof as well as the appended drawings.

To achieve these objects and other advantages and in accordance with the purpose of the embodiments, as embodied and broadly described herein, a light emitting element driving apparatus for controlling a light emitting unit including serially connected light emitting element arrays, includes a rectifying unit configured to provide a rectified signal to the light emitting unit according to a result of rectifying an alternating current (AC) signal, a switching unit configured to selectively connect output terminals of the light emitting element arrays to a first node, an amplifying unit configured to amplify each of reference voltages having different levels and a voltage of a second node and to generate first amplified signals controlling the switching unit according to an amplification result, a sensing resistor connected between the second node and an electrical ground, and a current sensing circuit configured to generate mirrored current by mirroring current supplied from the first node and to provide the mirrored current to the second node.

The switching unit may include a plurality of switches and each of the plurality of switches may include a gate to which any corresponding one of the first amplified signals is input, a drain connected to any corresponding one of the output terminals of the light emitting element arrays, and a source connected to the first node.

The amplifying unit may include a plurality of amplifiers, each of the plurality of amplifiers may include a first input terminal to which a voltage of the second node is input, a second input terminal to which any corresponding one of the reference voltages is input, and an output terminal for outputting any corresponding one of the first amplified signals.

The mirrored current may be less than the current supplied from the first node.

The current sensing circuit may include a first current mirror configured to mirror the current supplied from the first node and to output primary mirrored current and a second current mirror configured to mirror the primary mirrored current and to output secondary mirrored current.

The primary mirrored current may be 1/K times the current supplied from the first node, K being a real number greater than 1.

The secondary mirrored current may be equal to the primary mirrored current.

The first current mirror may include a first transistor to which the current supplied from the first node is input and a second transistor into which the primary mirrored current flows, and the second current mirror may include a third transistor connected to the second transistor, the primary mirrored current flowing into the third transistor, and a fourth transistor connected to the second node, the secondary mirrored current flowing into the fourth transistor.

The current sensing circuit may further include an amplifier configured to generate a second amplified signal according to a result of amplifying a voltage of the first node and a voltage of an output terminal of the first current mirror and to provide the second amplified signal to gates of the third and fourth transistors.

The current sensing circuit may include a first current mirror including a first transistor and a second transistor, the first transistor including a first drain connected to the first node, a first source connected to the ground power source, and a first gate to which the first power source is applied, the second transistor including a second drain, a second source connected to the ground power source, and a second gate connected to the first gate, the first power source being applied to the second gate; a second mirror including a third transistor and a fourth transistor, the third transistor including a third drain connected to the second drain, a third source to which the first power source is applied, and a third gate to which a second amplified signal is applied, the fourth transistor including a fourth drain connected to the second node, a fourth source to which the first power source is applied, and a fourth gate connected to the third gate, the second amplified signal being applied to the fourth gate; and an amplifier configured to amplify voltages of the first and second drains and to output the second amplified signal according to an amplification result.

A light emitting element driving apparatus for controlling a light emitting unit including serially connected light emitting element arrays according to another embodiment includes a rectifying unit configured to provide a rectified signal to the light emitting unit according to a result of rectifying an alternating current (AC) signal, a switching unit configured to selectively connect output terminals of the light emitting element arrays to a first node, a sensing resistor connected between the first node and an electrical ground, an amplifying unit configured to amplify each of reference voltages having different levels and a voltage of the first node and to generate first amplified signals controlling the switching unit according to an amplification result; and a power factor correction unit connected between an electrical ground and a second node to which one terminal of the rectifying unit outputting the rectified signal and the light emitting unit are connected, wherein the power factor correction unit includes a capacitor including one terminal connected to the second node and includes a voltage regulator connected to the other terminal of the capacitor, and wherein the power factor correction unit causes current flowing into the ground power source from the second node to be charged in the capacitor when a voltage level of the rectified signal is greater than a reference voltage level and causes the current charged in the capacitor to be discharged to the light emitting unit through the second node when the voltage level of the rectified signal is less than a reference voltage level.

The reference voltage level may be ½ times a maximum value of the rectified signal.

The switching unit may include a plurality of switches, each of the plurality of switches including a gate to which any corresponding one of the first amplified signals is input, a drain connected to any corresponding one of the output terminals of the light emitting element arrays, and a source connected to the first node.

The amplifying unit may include a plurality of amplifiers and each of the plurality of amplifiers may include a first input terminal to which a voltage of the first node is input, a second input terminal to which any corresponding one of the reference voltages is input, and an output terminal outputting any corresponding one of the first amplified signals.

The voltage regulator may include a resistor having one terminal connected to the ground power source, a transistor connected to the other terminal of the capacitor and the other terminal of the resistor, and an amplifier including a first input terminal connected to a node to which the other terminal of the resistor and the transistor are connected, a second input terminal to which a preset voltage is input, and an output terminal connected to a gate of the transistor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates a current error of a first light emitting element array when the first light emitting element array of a light emitting unit in a lighting device is turned on according to an embodiment;

FIG. 4 illustrates current flowing into a light emitting unit according to magnitude of a rectified signal;

DETAILED DESCRIPTION OF THE INVENTION

Figure 1:
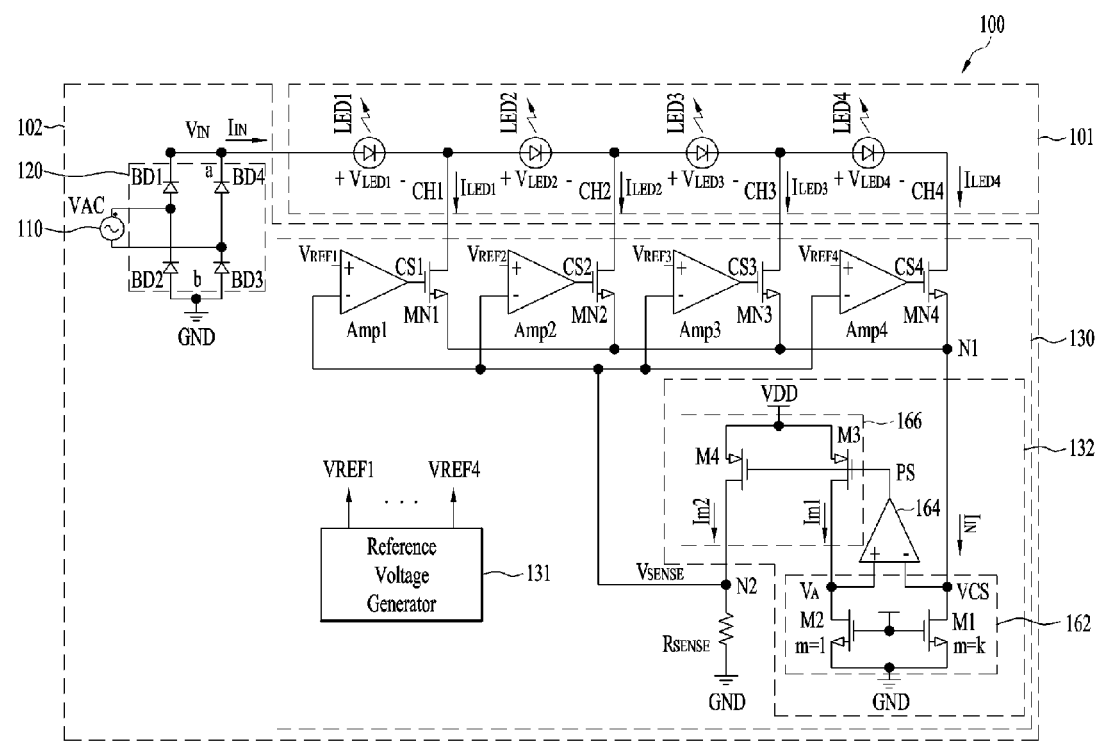
FIG. 1 illustrates the construction of a lighting device including a light emitting element driving apparatus according to an embodiment.

Hereinafter, the embodiments will be clearly appreciated through the accompanying drawings and the following description thereof. In describing the embodiments, it will be understood that, when an element such as a layer (film), region, pattern or structure is referred to as being formed "on" or "under" another element, such as a substrate, layer (film), region, pad or pattern, it can be directly "on" or "under" the other element or be indirectly formed with intervening elements therebetween. It will also be understood that "on" or "under" the element may be described relative to the drawings.

In the drawings, the size of each layer may be exaggerated, omitted, or schematically illustrated for clarity and convenience. In addition, the size of each constituent element does not wholly reflect an actual size thereof. In addition, the same reference numerals designate the same constituent elements throughout the description of the drawings.

FIG. 1 illustrates the construction of a lighting device 100 including a light emitting element driving apparatus 102 according to an embodiment.

Referring to FIG. 1, the lighting device 100 includes a light emitting unit 101 and the light emitting element driving apparatus 102 for controlling operation of the light emitting unit 101.

The light emitting unit 101 includes a plurality of serially connected light emitting element arrays (e.g., LED1 to LED4). Although FIG. 1 illustrates four light emitting element arrays, the number of light emitting element arrays is not limited thereto and two or more light emitting element arrays may be provided.

Each of the light emitting element arrays (e.g. LED1 to LED4) may include one or more LEDs.

If a plurality of LEDs is included in each light emitting element array, the LEDs may be connected in series or in parallel or may be connected serially and in parallel.

The light emitting element driving apparatus 102 controls the light emitting element arrays (e.g., LED1 to LED4) to be turned on and off.

The light emitting element driving apparatus 102 may include an AC power source unit 110, a rectifying unit 120, a control unit 130, and a sensing resistor $R_{SENSE}$.

The AC power source unit 110 supplies an AC signal VAC to the rectifying unit 120.

The AC signal VAC supplied by the AC power source unit 110 may be, without being limited to, a sine wave or a cosine wave. For example, the AC signal VAC supplied by the AC power source unit 110 may be, without being limited to, an AC voltage having a frequency of 50 Hz or 60 Hz.

The light emitting element driving apparatus 102 may further include a fuse (not shown) connected between the AC power source unit 110 and the rectifier 130. The fuse may be disconnected when an AC signal having an instantaneously high level is provided, thereby protecting the light emitting element driving apparatus 102 from the AC signal having a high level.

The rectifying unit 120 rectifies the AC signal VAC supplied by the AC power source unit 110 and outputs a rectified signal (i.e., a ripple current $V_{IN}$) according to a result of rectifying the AC signal VAC.

The rectifying unit 120 may be implemented by a bridge diode circuit including four diodes BD1, BD2, BD3, and BD4 connected to each other by a bridge structure. However, the rectifying unit 120 is not limited to such a circuit. For example, the rectifying unit 120 may full-wave rectify the AC signal VAC and output the rectified signal $V_{IN}$ which is a full-wave rectified AC signal.

The rectified signal $V_{IN}$ may be supplied to the light emitting unit 101. For example, the rectified signal $V_{IN}$ may be supplied to the first input stage of the serially connected light emitting element arrays, e.g., to both terminals of the first light emitting element array LED1.

The control unit 130 may include an amplifying unit including a plurality of amplifiers Amp1 to Amp4, a switching unit including a plurality of switches MN1 to MN4, and a current sensing circuit 132. Although, in FIG. 1, there are four amplifiers and four switches which are the same in number as the light emitting element arrays, the numbers of the amplifiers and switches are not limited to four.

The amplifying unit amplifies a plurality of reference voltages $V_{REF1}$ to $V_{REF4}$ having different levels and a voltage Vcs of a first node N1 and outputs amplified signals CS1 to CS4 according to an amplification result.

The amplifiers Amp1 to Amp4 may serve to cause constant current to flow into the switches MN1 to NM4 through feedback control.

Each of the amplifiers Amp1 to Amp4 may include a first input terminal (e.g., a minus (−) input terminal) to which a voltage $V_{SENSE}$ of a second node N2 is input, a second input terminal (e.g., a plus (+) input terminal) to which any corresponding one of the reference voltages $V_{REF1}$ to $V_{REF4}$ is input, and an output terminal which outputs any corresponding one of the amplified signals CS1 to CS4.

The first input terminals (e.g. − input terminals) of the amplifiers Amp1 to Amp4 may be connected to the second node N2 of the current sensing circuit 132.

Each of the output terminals of the amplifiers Amp1 to Amp4 may be connected to any corresponding one of gates of the switches MN1 to MN4. For example, each of the amplified signals CS1 to CS4 may be supplied to any corresponding one of the gates of the switches MN1 to MN4.

As an example, the first amplifier Amp1 may amplify the voltage Vcs of the first node N1 and the first reference voltage $V_{REF1}$ and output the first amplified signal CS1 according to an amplification result. The first amplifier Amp2 may amplify the voltage Vcs of the first node N1 and the second reference voltage $V_{REF2}$ and output the second amplified signal CS2 according to an amplification result. The third amplifier Amp3 may amplify the voltage Vcs of the first node N1 and the third reference voltage $V_{REF3}$ and output the third amplified signal CS3 according to an amplification result. The fourth amplifier Amp4 may amplify the voltage Vcs of the first node N1 and the fourth reference voltage $V_{REF4}$ and output the fourth amplified signal CS3 according to an amplification result.

The amplifiers Amp1 to Amp4 may be differential amplifiers, for example, differential operational amplifiers and may include other amplifiers.

The switching unit connects any one of first to fourth channel lines CH1 to CH4 to the first node N1 based on the amplified signals CS1 to CS4. The first to fourth channel lines CH1 to CH4 may be connected between output terminals of the serially connected light emitting element arrays and the first node N1. For example, the output terminals of the light emitting element arrays may be − terminals of the light emitting element arrays.

As an example, the switches MN1 to MN4 may serve as channels between the light emitting element arrays LED1 to LED4 and the first node N1. The switches MN1 to MN4 may be implemented by transistors. Although the switches MN1 to MN4 shown in FIG. 1 are implemented by field-effect transistors (FETs), for example, N-type metal-oxide-semiconductor (NMOS) transistors, embodiments are not limited thereto.

Each of the switches MN1 to MN4 may include a gate to which any corresponding one of the amplified signals CS1 to CS4 is input, a drain (or a source) connected to any corresponding one of the output terminals of the light emitting element arrays, and a source (or a drain) connected to the first node N1. The first node N1 may be a node to which the sources or drains of the switches MN1 to MN4 are commonly connected.

The switches MN1 to MN4 may be turned on or off based on the amplified signals CS1 to CS4.

The sensing resistor $R_{SENSE}$ is connected between the second node N2 and an electrical ground GND and serves to change current information into voltage information. For example, one terminal of the sensing resistor $R_{SENSE}$ may be connected to the second node N2 and the other terminal of the sensing resistor $R_{SENSE}$ may be connected to the ground power source GND.

The second node N2 may be a node to which one terminal of the sensing resistor $R_{SENSE}$, the first input terminals (e.g., − input terminals) of the amplifiers Amp1 to Amp4, and the current sensing circuit 132 are connected.

The current sensing circuit 132 is connected between the first node N1 and the second node N2.

The current sensing circuit 132 may include a first current mirror 162, an amplifier 164, and a second current mirror 166.

The first current mirror 162 mirrors current $I_{IN}$ supplied from the first node N1 via the light emitting unit 101 and outputs a primary mirrored current Im1 according to a mirrored result.

The first current mirror 162 may include a first transistor M1 to which the current $I_{IN}$ supplied from the first node N1 is input and a second transistor M2 into which the primary mirrored current Im1 flows. For example, the primary mirrored Im1 may be less than the current $I_{IN}$ provided from the first node N1 (i.e., Im1<$I_{IN}$).

Each of the first and second transistors M1 and M2 may be an NMOS transistor, without being limited thereto.

For example, the first transistor M1 may include a first drain connected to the first node N1, a first source connected to the ground power source GND, and a first gate to which a first power source VDD is applied. The second transistor M2 may include a second drain, a second source connected to the ground power source GND, and a second gate which is connected to the first gate of the first transistor M1 and to which the first power source VDD is applied.

For example, the width of the second transistor M2 may be 1/K times the width of the first transistor M1 and the primary mirrored current Im1 may be 1/K times the current $I_{IN}$ supplied from the first node N1 according to the MOS scaling theory (where K is a real number greater than 1).

Herein, since the first power source VDD is applied to the first gate of the first transistor M1, the first transistor M1 may be equivalently expressed as an ON resistor operating in a region in which the first transistor M1 is fully turned on.

The ON resistor $R_{ON}$ equivalent to the first transistor M1 may be indicated by Equation 1.

$$R_{ON} = \frac{1}{\left[\mu_n \times C_{OX} \times \frac{W}{L}(VDD - V_{TH})\right]} \quad \text{[Equation 1]}$$

Herein, $\mu_n$ may be electron mobility, $C_{OX}$ may be gate oxide capacitance of the first transistor M1, W may be width of the first transistor M1, L may be length of the first transistor M1, VDD may be a first voltage applied to the first gate of the first transistor M1, and $V_{TH}$ may be a threshold voltage of the first transistor M1.

The second current mirror 166 mirrors the primary mirrored current Im1 and outputs a secondary mirrored current Im2 according to a mirrored result. For example, the secondary mirrored current Im2 may be identical to the primary mirrored current Im1 (i.e., Im2=Im1). Therefore, the secondary mirrored current Im2 may be 1/K times the current $I_{IN}$ supplied from the first node N1 (where K is a real number greater than 1).

The second current mirror 166 may include a third transistor M3 which is connected to the second transistor M2 and into which the primary mirrored current Im1 flows and a fourth transistor M4 which is connected to the second node N2 and into which the secondary mirrored current Im2 flows.

Each of the third and fourth transistors M3 and M4 may be, without being limited to, a P-type MOS (PMOS) transistor. For example, the third and fourth transistors M3 and M4 may be configured to have a conductivity type opposite to the first and second transistors M1 and M2.

For example, third transistor M3 may include a third drain connected to the second drain of the second transistor M2, a third source to which the first power voltage VDD is applied, and a third gate to which an amplified signal PS is applied.

The fourth transistor M4 may include a fourth drain connected to the second node N2, a fourth source to which the first power source VDD is applied, and a fourth gate which is connected to the third gate and to which the amplified signal PS is applied.

For example, the width of the fourth transistor M4 may be identical to the width of the third transistor M3 and the secondary mirrored current Im2 may be identical to the primary mirrored current Im1 according to the MOS scaling theory. However, embodiments are not limited thereto.

The amplifier 164 generates the amplified signal PS according to a result of amplifying the voltage $V_{CS}$ of the first node N1 and a voltage of the output terminal of the first current mirror 162 (e.g., the drain of the second transistor M2) and provides the amplified signal PS to the gates of the third and fourth transistors M3 and M4. The amplifier 164 may serve to equalize the voltage Vcs of the first node N1 and a voltage $V_A$ of a connection point between a second input terminal of the amplifier 164 and the drain of the second transistor M2.

For example, the amplifier 164 may amplify voltages of the drains of the first and second transistors M1 and M2 and output the amplified signals PS according to an amplification result.

For example, the amplifier 164 may include a first input terminal (e.g., a – input terminal) connected to the first node N1, a second input terminal (e.g., a + input terminal) connected to the drain of the second transistor M2, and an output terminal for outputting the amplified signal PS. The amplifier 164 may be implemented by an operational amplifier, without being limited thereto.

The voltage Vcs of the first node N1 may become equal to the voltage $V_A$ of the connection point between the second input terminal of the amplifier 164 and the drain of the second transistor M2 by a negative feedback loop including the amplifier 162 and the third transistor M3.

FIG. 4 illustrates the current $I_{IN}$ flowing into the light emitting unit 101 according to magnitude of the rectified signal $V_{IN}$.

Referring to FIG. 4, in an interval during which the rectified signal $V_{IN}$ is less than a first voltage level $V_{LED1}$ ($V_{IN}$<$V_{LED1}$), all of the amplified signals CS1 to CS4 may be low levels, all of the first to fourth switches MN1 to MN4 may be turned off, all of the first to fourth light emitting element arrays LED1 to LED4 may be turned off, and the current $I_{IN}$ flowing into the light emitting unit 101 may be 0.

For example, the first voltage level $V_{LED1}$ may be equal to an operation voltage capable of operating one light emitting element array (e.g., LED1).

In a first interval during which the rectified signal $V_{IN}$ is equal to or greater than the first voltage level $V_{LED1}$ and less than a second voltage level ($V_{LED1}$+$V_{LED2}$), the first amplified signal CS1 may be a high level, the second to fourth amplified signals CS2 to CS4 may be low levels, the first switch MN1 may be turned on, the second to fourth switches MN2 to MN4 may be turned off, the first light emitting element array LED1 may be turned on, and the second to fourth light emitting element arrays LED2 to LED4 may be turned off. In this case, the current $I_{IN}$ (=$I_{LED1}$) flowing into first light emitting element array LED1 of the light emitting unit 101 may be K times a value obtained by dividing the first reference voltage $V_{REF1}$ by resistance of the sensing resistor $R_{SENSE}$.

For example, the second voltage level $V_{LED1}$+$V_{LED2}$ may be equal to an operation voltage capable of operating two light emitting element arrays (e.g., LED1 and LED2).

In a second interval during which the rectified signal $V_{IN}$ is equal to or greater than the second voltage level $V_{LED1}$+$V_{LED2}$ and less than a third voltage level $V_{LED1}$+$V_{LED2}$+$V_{LED3}$, the second amplified signal CS2 may be a high level, the other amplified signals CS1, CS3, and CS4 may be low levels, the second switch MN2 may be turned on, the other switches MN1, M3, and MN4 may be turned off, the first and second light emitting element arrays LED1 and LED2 may be turned on, and the third and fourth light emitting element arrays LED3 and LED4 may be turned off. In this case, the current $I_{IN}$ (=$I_{LED2}$) flowing into the first and second light emitting element arrays LED1 and LED2 of the light emitting unit 101 may be K times a value obtained by dividing the second reference voltage $V_{REF2}$ by resistance of the sensing resistor $R_{SENSE}$.

In a third interval during which the rectified signal $V_{IN}$ is equal to or greater than the third voltage level $V_{LED1}$+$V_{LED2}$+$V_{LED2}$ and less than a fourth voltage level $V_{LED1}$+$V_{LED2}$+$V_{LED3}$+$V_{LED4}$, the third amplified signal CS3 may be a high level, the other amplified signals CS1, CS2, and CS4 may be low levels, the third switch MN3 may be turned on, the other switches MN1, MN2, and MN4 may be turned off, the first to third light emitting element arrays LED1 to LED3 may be turned on, and the fourth light emitting element array LED4 may be turned off. In this case, the current $I_{IN}$ (=$I_{LED3}$) flowing into the first to third light emitting element arrays LED1 to LED3 of the light emitting unit 101 may be K times a value obtained by dividing the third reference voltage $V_{REF3}$ by resistance of the sensing resistor $R_{SENSE}$.

In a fourth interval during which the rectified signal $V_{IN}$ is equal to or greater than the fourth voltage level $V_{LED1}$+$V_{LED2}$+$V_{LED2}$+$V_{LED4}$, the fourth amplified signal CS4 may be a high level, the other amplified signals CS1 to CS3 may be low levels, the fourth switch MN4 may be turned on, the other switches MN1 to MN3 may be turned off, and all of the first to fourth light emitting element arrays LED1 to LED4 may be turned on. In this case, the current $I_{IN}$ (=$I_{LED4}$) flowing into the first to fourth light emitting element arrays LED1 to LED4 of the light emitting unit 101 may be K times a value obtained by dividing the fourth reference voltage $V_{REF4}$ by resistance of the sensing resistor $R_{SENSE}$.

In the case in which the current sensing circuit 132 is omitted and the first node N1 is connected to the second node N2 in FIG. 1 (hereinafter, referred to as "CASE1"), the current flowing into the light emitting unit 101, the voltage of the first node N1, and a power consumed at the sensing resistor will described below.

In each of the first to fourth intervals, the current flowing into the light emitting unit 101 may be 1/K times the current $I_{IN}$ flowing into the light emitting unit 101 according to an embodiment. In addition, in each of the first to fourth intervals, the voltage of the first node N1 may be equal to a reference voltage corresponding to each interval.

In addition, in each of the first to fourth intervals, power consumption at the sensing resistor $R_{SENSE}$ may be a value obtained by dividing the square of the voltage $V_{SENSE}$ of the sensing resistor $R_{SENSE}$ by resistance of the sensing resistor $R_{SENSE}$. In addition, a voltage of the rectified signal $V_{IN}$ for operating the light emitting unit 101 may be equal to or greater than the sum of the operation voltage $V_{LED1}$ of first light emitting element array LED1, a drain-source voltage of the first switch MN1, and the voltage $V_{SENSE}$ of the sensing resistor $R_{SENSE}$.

Figure 2:
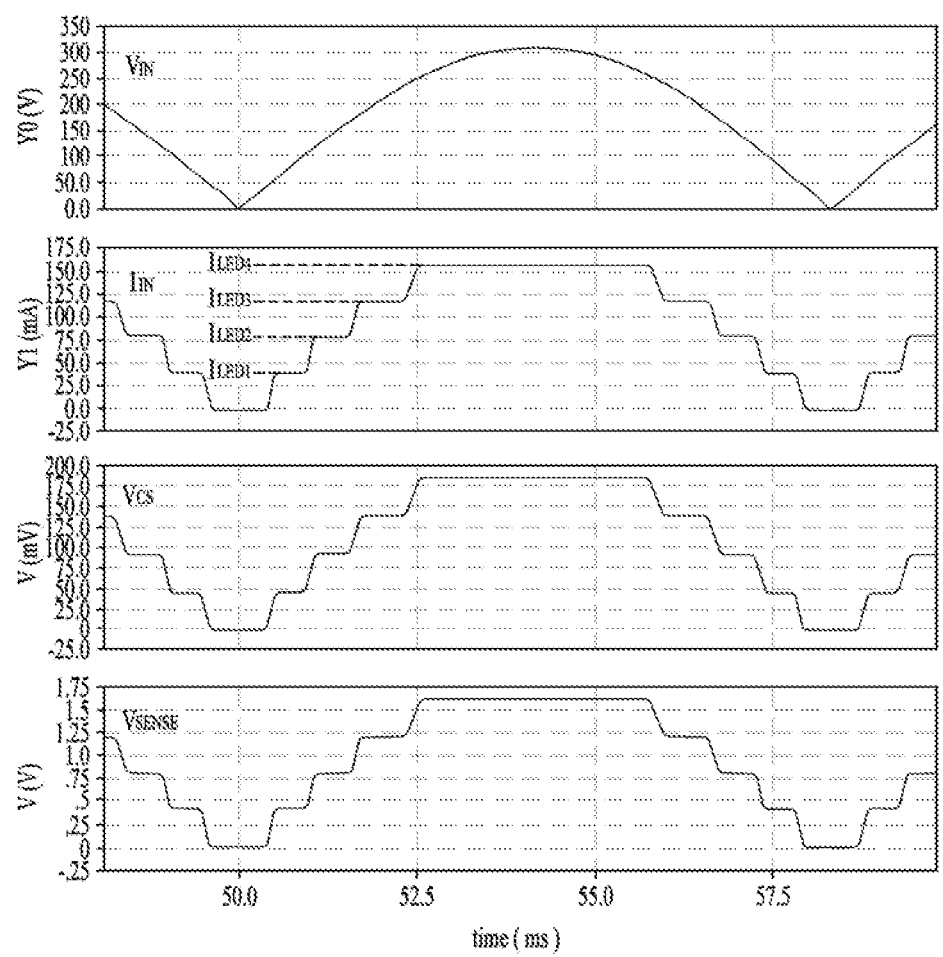
FIG. 2 illustrates simulation results of a rectified signal, a current flowing into a light emitting unit, a voltage of a first node, and a voltage across both terminals of a sensing resistor according to an embodiment.

FIG. 2 illustrates simulation results of the rectified signal $V_{IN}$, the current $I_{IN}$ flowing into the light emitting unit 101, the voltage Vcs of the first node N1, and the voltage $V_{SENSE}$ across both terminals of the sensing resistor $R_{SENSE}$ according to an embodiment.

Simulation conditions of FIG. 2 are as follows. A root mean square of the AC signal VAC supplied by the AC power source unit 110 is 220V, the frequency of the AC signal VAC is 60 Hz, the first voltage VDD is 12V, resistance of the sensing resistor is 20 KΩ, K of the first current mirror 162 is 2000, the first reference voltage $V_{REF1}$ is 0.4V, the second reference voltage $V_{REF2}$ is 0.8V, the third reference voltage $V_{REF3}$ is 1.2V, and the fourth reference voltage $V_{REF4}$ is 1.6V.

Referring to FIG. 2, the embodiment shows that the current $V_{IN}$ flowing into the light emitting unit 101 during each interval according to a level of the rectified signal $V_{IN}$ is stably generated. It can be understood that, as compared with the voltage $V_{SENSE}$ of the sensing resistor, the voltage of the first node N1 has a low voltage drop of about 200 mV or less.

FIG. 3 illustrates a current error of the first light emitting element array LED1 when the first light emitting element array LED1 of the light emitting unit 101 in the lighting device 100 is turned on according to an embodiment.

The current error of the first light emitting element array LED1 may be an error between an ideal current which should flow into the first light emitting element array LED1 and an actual current flowing into the first light emitting element array LED1.

Referring to FIG. 3, when a current range is between 10 mA and 160 mA, since the range of the current error is 0.7 to 1.6%, it can be understood that the embodiment has high current accuracy.

As compared with "CASE1", the embodiment enables the current sensing circuit 132 to lower the current flowing into the sensing resistor $R_{SENSE}$ and to lower voltage drop generated by the sensing resistor $R_{SENSE}$, thereby reducing power consumed at the sensing resistor $R_{SENSE}$.

The resistance of the ON resistor $R_{ON}$ equivalent to the first transistor M1 described in Equation 1 may be less than the resistance of the sensing resistor $R_{SENSE}$. Accordingly, in the embodiment, the voltage of the rectified signal $V_{IN}$ for operating the light emitting unit 101 may be less than a value in "CASE1".

Figure 5:
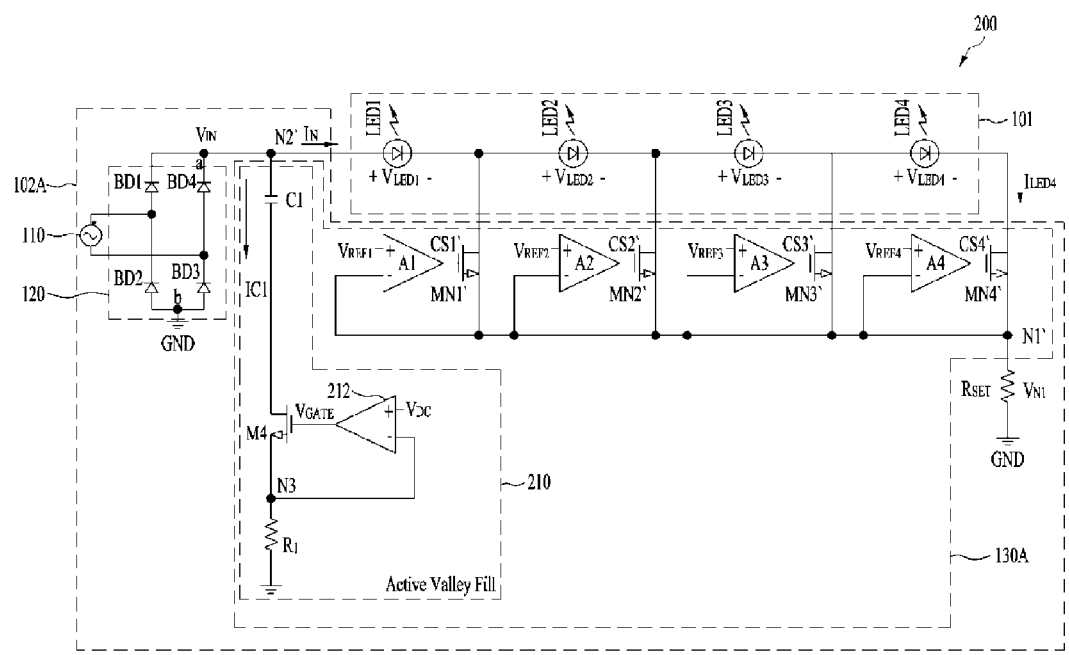
FIG. 5 illustrates the construction of a lighting device including a light emitting element driving apparatus according to another embodiment.

FIG. 5 illustrates the construction of a lighting device 200 including a light emitting element driving apparatus 102A according to another embodiment. The same reference symbols as in FIG. 1 represent the same elements and a description of the same configuration as in FIG. 1 is simplified or omitted.

Referring to FIG. 5, the lighting device 200 includes a light emitting unit 101 and the light emitting element driving apparatus 102A for controlling operation of the light emitting unit 101.

The light emitting element driving apparatus 102A may include the AC power source unit 110, the rectifying unit 120, the sensing resistor $R_{SET}$, and a control unit 130A.

The control unit 130A may include an amplifying unit including a plurality of amplifiers A1 to A4, a switching unit including a plurality of switches MN1' to MN4', and a power factor correction unit 210. Although FIG. 5 illustrates four amplifiers A1 to A4 and four switches MN1' to MN4' which are the same in number as the light emitting element arrays, the numbers of the amplifiers and the switches are not limited to four and may be two or more.

The amplifying unit amplifies reference voltages $V_{REF1}$ to $V_{REF4}$ having different levels and a voltage $V_{N1}$ of a first node N1' and outputs amplified signals CS1' to CS4' according to the amplification results.

The amplifiers A1 to A4 of the amplifying unit may sever to cause constant current to flow into the switches MN1' to MN4' of the switching unit through feedback control.

Each of the amplifiers A1 to A4 may include a first input terminal (e.g., a − input terminal) to which a voltage $V_{N1}$ of the first node N1' is input, a second input terminal (e.g., a + input terminal) to which any corresponding one of the reference voltages $V_{REF1}$ to $V_{REF4}$ is input, and an output terminal which outputs any corresponding one of the amplified signals CS1' to CS4'.

The first input terminals (e.g., − input terminals) of the amplifiers A1 to A4 may be commonly connected to the first node N1'. The first node N1' may be a node to which one terminal of a sensing resistor $R_{SET}$, the first input terminals (e.g., − input terminals) of the amplifiers A1 to A4, and one terminal of the switch MN4' connected to the last light emitting element array LED4 are commonly connected.

Each of the output terminals of the amplifiers A1 to A4 may be connected to any corresponding one of gates of the switches MN1' to MN4'. For example, each of the amplified signals CS1' to CS4' may be provided to any corresponding one of the gates of the switches MN1' to MN4'.

The amplifiers A1 to A4 may be, without being limited to, differential amplifiers, for example, differential operational amplifiers.

The switching unit may selectively connect output terminals of the light emitting element arrays LED1 to LED4 to the first node N1'.

The switches MN1' to MN4' may serve as channels for interconnecting the light emitting element arrays LED1 to LED4 and the first node N1'. The switches MN1' to MN4' may be implemented by transistors. Although each of the switches MN1' to MN4' shown in FIG. 5 is implemented by an FET, for example, an NMOS transistor, the switches are not limited thereto.

Each of the switches MN1' to MN4' may include a gate to which any corresponding one of the amplified signals CS1' to CS4' is input, a drain (or a source) connected to any corresponding one of the output terminals of the light emitting element arrays, and a source (or a drain) connected to the first node N1'.

The sensing resistor $R_{SET}$ is connected between the first node N1' and an electrical ground GND and serves to change current information into voltage information. For example, one terminal of the sensing resistor $R_{SET}$ may be connected to the first node N1' and the other terminal of the sensing resistor $R_{SET}$ may be connected to the ground power source GND.

The power factor correction unit 210 is connected between a second node N2' and the ground power source GND and functions to correct a power factor of the light emitting unit 101 and to prevent flickering.

The second node N2' may be a node to which one terminal a of the rectifying unit 120 which generates the rectified signal $V_{IN}$ and the input terminal of the light emitting unit 101 are connected. For example, the input terminal of the light emitting unit 101 may be a positive (+) terminal of the first emitting element array LED1 of the serially connected light emitting element arrays.

The power factor correction unit 210 charges a capacitor C1 by a current IC1 flowing into the ground power source GND from the second node NT when the voltage level of the rectified signal $V_{IN}$ is greater than a reference voltage level and discharges the charged capacitor C1 to the light emitting unit 101 through the second node NT when the voltage level of the rectified signal $V_{IN}$ is less than the reference voltage level.

The power factor correction unit 210 includes the capacitor C1 having one terminal connected to the second node NT and a voltage regulator connected to the other terminal of the capacitor C1, wherein the voltage regulator includes a transistor M4, a resistor R1, and an amplifier 212.

For example, the power factor correction unit 210 may include the capacitor C1, the transistor M4, the resistor R1, and the amplifier 212.

The one terminal of the capacitor C1 is connected to the second node NT for a charge or discharge operation.

The transistor M4 is connected between the capacitor C1 and the resistor R1 and turned on or off based on an output signal $V_{GATE}$ of the amplifier 212.

The resistor R1 is connected between the transistor M4 and the ground power source GND.

The amplifier 212 may include a first input terminal (e.g., − input terminal) connected to a third node N3 to which the resistor R1 and the transistor M4 are connected, a second input terminal (e.g., a + input terminal) to which a preset voltage $V_{DC}$ is input, and an output terminal connected to a gate of the transistor M4. The preset voltage $V_{DC}$ may be a direct current (DC) voltage and may be set by magnitude of the charge current IC1 and resistance of the resistor R1.

The transistor M4, the amplifier 212, and the resistor R1 may serve as a function of the voltage regulator which provides a constant voltage to the third node N3.

Figure 6:
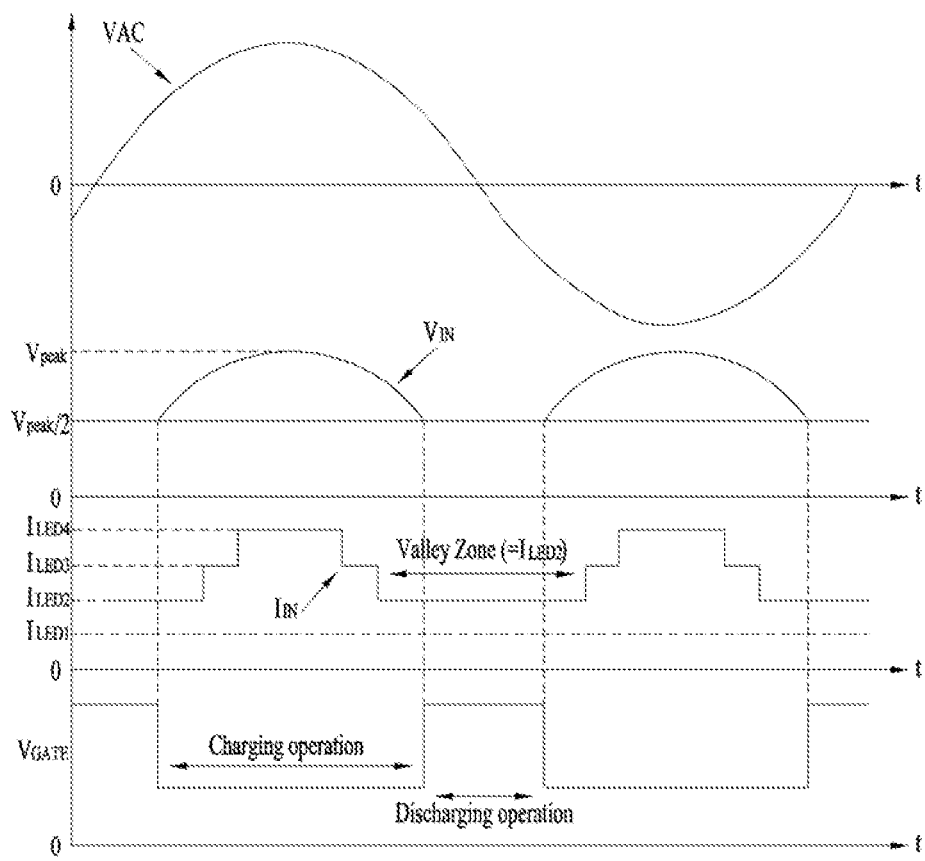
FIG. 6 illustrates simulation results of a rectified signal, current flowing into a light emitting unit, and an output voltage of an amplifier of a power factor correction unit.

FIG. 6 illustrates simulation results of the rectified signal $V_{IN}$, the current $I_{IN}$ flowing into the light emitting unit 101, and the output voltage $V_{GATE}$ of the amplifier M4 of the power factor correction unit 210.

Referring to FIG. 6, in an interval during which the voltage level of the rectified signal $V_{IN}$ is greater than a reference voltage level, a charging operation in which the current IC1 flowing from the second node NT into the resistor R1 via the voltage regulator including the transistor M4, the amplifier 212, and the resistor R1 is charged in the capacitor C1 may be performed. For example, the reference voltage level may be, without being limited to, a voltage corresponding to ½ times a maximum voltage of the rectified signal $V_{IN}$. In the charging operation interval, magnitude of the current IC1 charging the first capacitor C1 may be a value obtained by dividing the preset voltage $V_{DC}$ by resistance of the resistor R1.

In an interval during which the voltage level of the rectified signal $V_{IN}$ is less than the reference voltage level, since the output voltage $V_{GATE}$ of the amplifier 212 becomes a high level, the transistor M4 is turned on. Therefore, a discharging operation in which the current IC1 charged in the capacitor C1 is discharged to the light emitting unit 101 may be performed.

Figure 7:
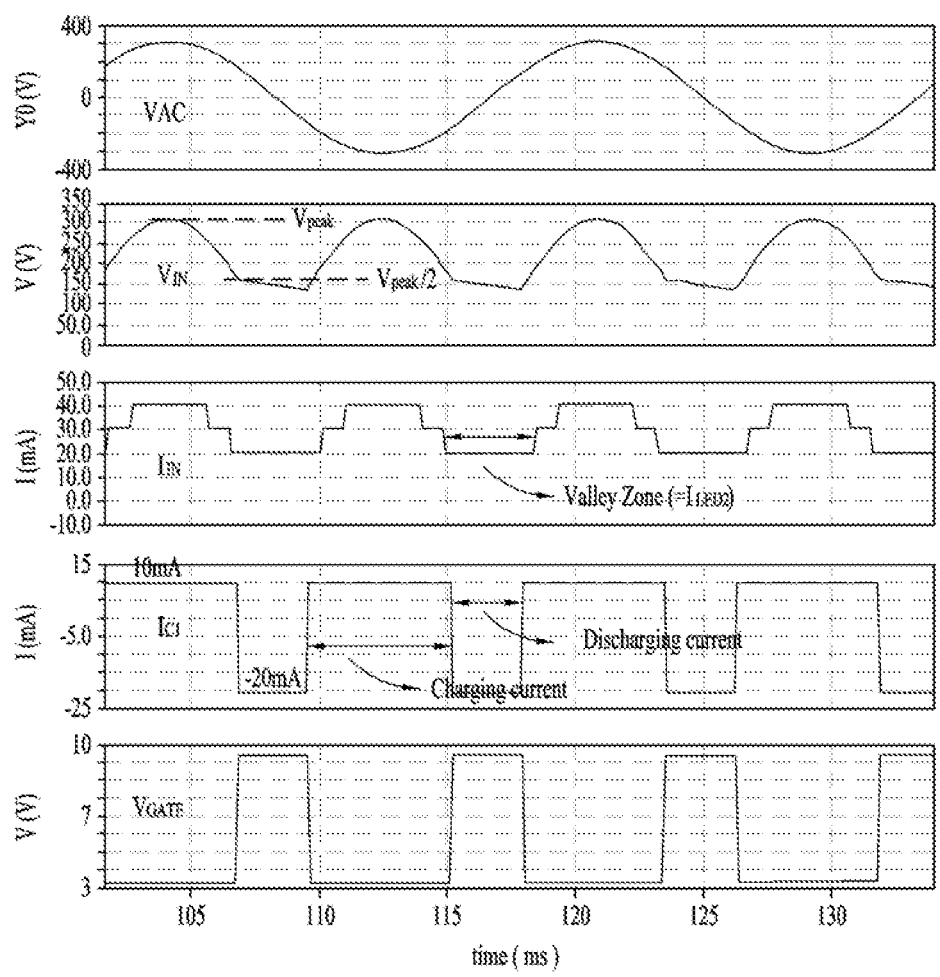
FIG. 7 illustrates simulation results of a rectified signal, current flowing into a light emitting unit, current flowing into a capacitor, and an output voltage of an amplifier M4 according to an embodiment.

FIG. 7 illustrates simulation results of the rectified signal $V_{IN}$, the current $I_{IN}$ flowing into the light emitting unit 101, the current IC1 flowing into the capacitor C1, and the output voltage $V_{GATE}$ of the amplifier M4 according to an embodiment.

Simulation conditions of FIG. 7 are as follows. A root mean square of an AC signal VAC supplied by the AC power source unit 110 is 220V, the frequency of the AC signal VAC is 60 Hz, the capacitance of the capacitor C1 is 2.2 microfarad (μF), the resistance of the resistor R1 is 80Ω, and the preset voltage $V_{DC}$ is 0.8V.

Referring to FIG. 7, an interval during which the voltage level of the rectified signal $V_{IN}$ is equal to or greater than the reference voltage level (e.g., $V_{peak}/2$=about 150V), a current of about 10 mA may be charged in the capacitor C1. On the other hand, in an interval during which the voltage level of the rectified signal $V_{IN}$ is less than the reference voltage level (e.g., $V_{peak}/2$=about 150V), the output voltage $V_{GATE}$ of the amplifier M4 transitions to a high level from a low level and a current of about 20 mA is discharged from the capacitor C1 to the light emitting unit 101. Therefore, in a valley zone or a discharging interval, the voltage level of the rectified signal $V_{IN}$ may be maintained closely to the reference voltage level. Substantially, the slope of the voltage level of the rectified signal $V_{IN}$ in the discharging interval may have a tendency toward significant decrease.

The power factor correction unit 210 according to an embodiment may be an active valley-fill circuit including the voltage regulator consisting of the transistor M4, the amplifier 212, and the resistor R1.

In the case in which the power factor correction unit 210 connected to the second node NT is omitted (hereinafter, referred to as "CASE2"), flicker may occur in the light emitting unit 101. This is because all arrays of the light emitting unit 101 are turned off when the voltage level of the rectified signal $V_{IN}$ is less than the first voltage level $V_{LED1}$. The flicker may cause eye fatigue, eyesight weakness, headache, etc.

A flicker characteristic of a lighting device using LEDs may be evaluated by a flicker data notation index.

Figures 9, 10:
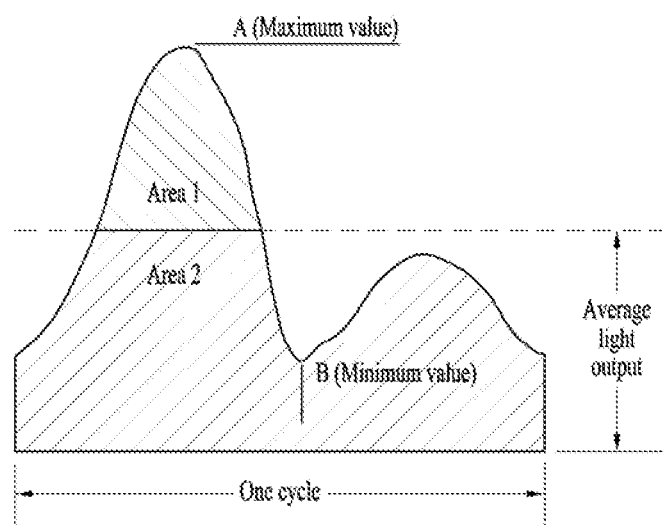
FIG. 9 illustrates light output of an LED lighting device referred to for explaining a flicker data notation index.
FIG. 10 illustrates a power factor, total harmonic distortion, percent flicker, and a flicker index according to "CASE2", "CASE3", and an embodiment.

FIG. 9 illustrates light output of an LED lighting device referred to for explaining a flicker data notation index.

Referring to FIG. 9, a percent flicker may be a percent (%) of a value obtained by dividing the difference (A−B) between a maximum value A and a minimum value B by the sum (A+B) of the maximum value A and the minimum value B. Herein, the maximum value A may be a maximum value of light output of the LED lighting device in one cycle and the minimum value B may be a minimum value of light output of the LED lighting device in one cycle.

A flicker index may be a value (Area1/(Area1+Area2)) obtained by dividing a first area Area1 by the sum (Area1+Area2) of the first area Area1 and a second area Area2.

The first area Area1 may be an area having light output higher than average light output and the second area Area2 may be an area having light output lower than the average light output.

As the percent flicker and the flicker index of the LED lighting device decrease, a flicker characteristic may be improved.

Since the light output of the LED lighting device is proportional to current flowing into an LED, the flicker characteristic may be evaluated using the current. Therefore, if there are small ripples flowing into the LED, the light output becomes uniform and thus the flicker characteristic may be improved. To improve the flicker characteristic, capacitors may be connected to the second node NT in "CASE2". However, it is noted that it is difficult to achieve high power factor performance when the capacitors are connected to the second node NT in "CASE2".

To improve power factor performance in "CASE2", a valley-fill circuit including two capacitors and three diodes may be connected to the second node NT of "CASE2".

The case in which the valley-fill circuit including two capacitors and three diodes is connected to the second node NT of "CASE2" is referred to as "CASE3".

For example, the valley-fill circuit may include first and second capacitors and first to third diodes. One terminal of the first capacitor and a negative terminal of the first diode may be connected to the second node N2', a positive terminal of the second diode may be connected to the other terminal of the first capacitor, a negative terminal of the second diode may be connected to a positive terminal of the first diode, a negative terminal of a third diode may be connected to the positive terminal of the second diode, a positive terminal of the third diode may be connected to an electrical ground, one terminal of the second capacitor may be connected to the negative terminal of the second diode, and the other terminal of the second capacitor may be connected to the ground power source.

Compared with "CASE2", power factor performance may be improved in "CASE3". However, "CASE3" has disadvantages in terms of cost reduction and size reduction because passive elements having a large size and a large area, for example, two capacitors and three diodes, are required.

Compared with "CASE3", the embodiment can reduce the costs and size of elements because there are few passive elements and the other elements except for the capacitor C1, which is a passive element, can be installed on one IC chip.

Figure 8A:
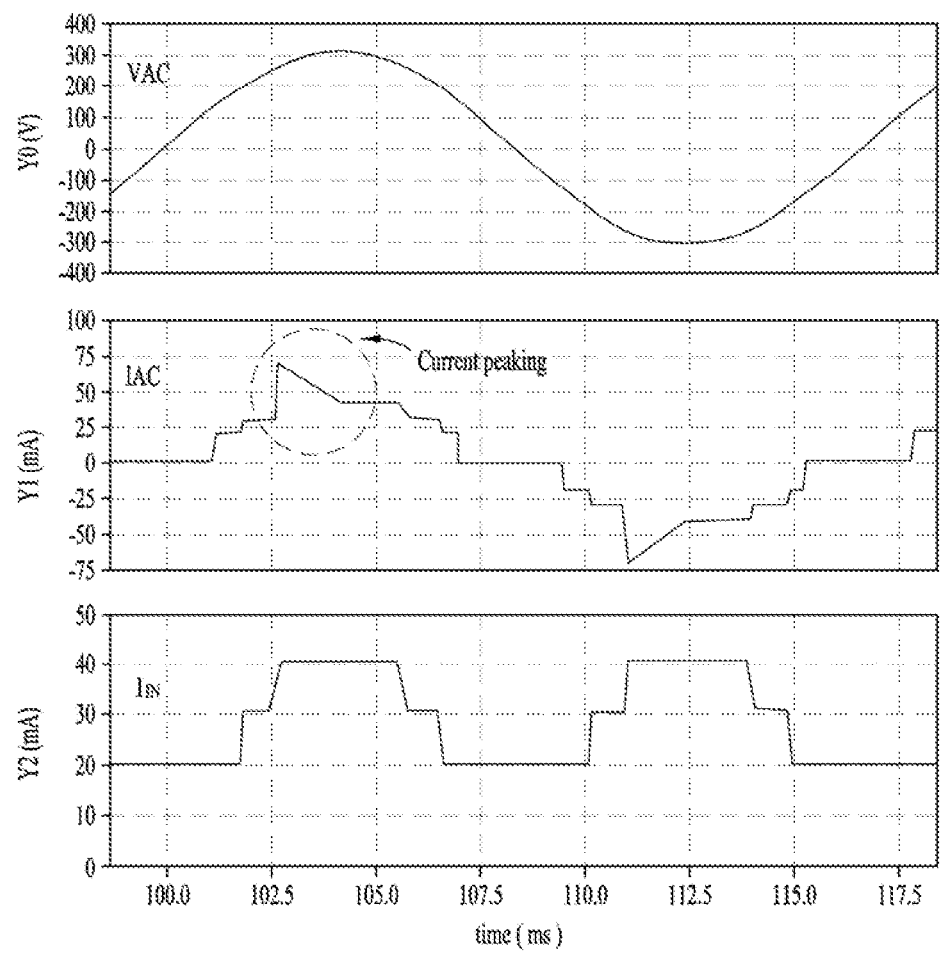
FIG. 8A illustrates simulation results of current flowing into two capacitors of a valley-fill circuit of "CASE3" and current flowing into a light emitting unit.
Figure 8B:
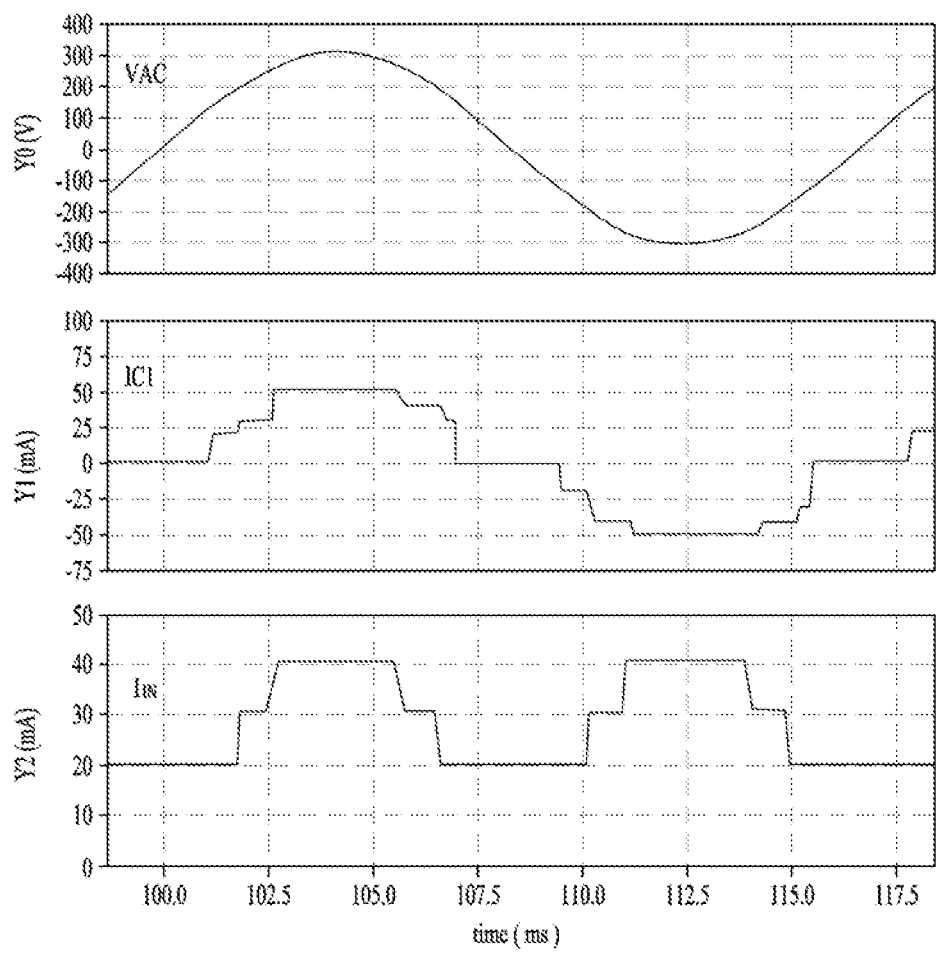
FIG. 8B illustrates simulation results of current flowing into a capacitor of a power factor correction unit and current flowing into a light emitting unit according to an embodiment.

FIG. 8A illustrates simulation results of a current IAC flowing into the two capacitors of the valley-fill circuit of "CASE3" and the current $I_{IN}$ flowing into the light emitting unit 101 and FIG. 8B illustrates simulation results of the current IC1 flowing into the capacitor C1 of the power factor correction unit 210 and the current $I_{IN}$ flowing into the light emitting unit 101 according to an embodiment.

Referring to FIGS. 8A and 8B, the current $I_{IN}$ flowing into the light emitting unit 101 of FIG. 8A and the current $I_{IN}$ flowing into the light emitting unit 101 may have the same waveform. Meanwhile, the current IAC flowing into the two capacitors of the valley-fill circuit of FIG. 8A and the current IC1 flowing into the capacitor C1 of the power factor correction unit 210 of FIG. 8B may have different waveforms. This is because a principle of charging a capacitor is different.

It may be understood that current peaking occurs in the current IAC flowing into the two capacitors when the two capacitors of the valley-fill circuit of FIG. 8A are charged. Such current peaking may deteriorate total harmonic distortion (THD) performance of the LED lighting device.

On the other hand, the embodiment can improve a power factor and THD performance because current peaking does not occur in the current IC1 flowing into the capacitor C1 of the power factor correction unit 210 by using the regulator including the transistor M4, the amplifier 212, and the resistor R1.

FIG. 10 illustrates a power factor (PF), THD, percent flicker, and a flicker index according to "CASE2", "CASE3", and an embodiment.

Referring to FIG. 10, since a PF of "CASE2" is 99.56% and THD of "CASE2" is 9.6%, the PF and THD of "CASE2" show high performance, whereas a flicker characteristic of "CASE2" is not good because a percent flicker and a flicker index are high.

As compared with "CASE2", "CASE3" improves a flicker characteristic but deteriorates the PF and THD performance.

As compared with "CASE2", it can be understood that the embodiment improves the PF and THD performance. In addition, it can be understood that the embodiment improves the flicker characteristic as compared with "CASE1" and has the same flicker characteristic as "CASE2".

As is apparent from the above description, the light emitting element driving apparatus according to the embodiments is capable of reducing power consumed in a sensing resistor and improving a power factor and THD.

Features, structures, effects, and the like as described above in the embodiments are included in at least one embodiment of the present invention and should not be limited to only one embodiment. In addition, the features, structures, effects, and the like described in the respective embodiments may be combined or modified even with respect to the other embodiments by those skilled in the art.

Accordingly, contents related to these combinations and modifications should be construed as within the scope of the present invention.

What is claimed is:

1. A light emitting element driving apparatus for controlling a light emitting unit including serially connected light emitting element arrays, the apparatus comprising:
a rectifying unit configured to provide a rectified signal to the light emitting unit by rectifying an alternating current (AC) signal;
a switching unit configured to selectively connect one of a plurality of output terminals, each of the output terminals corresponding to a light emitting element array, to a first node;
an amplifying unit configured to amplify each of a plurality of unique reference voltages and a voltage of a second node to generate first amplified signals, wherein the first amplified signals are configured to control the switching unit according to an amplification result;
a sensing resistor connected between the second node and an electrical ground; and
a current sensing circuit configured to generate a mirrored current by mirroring current supplied from the first node and providing the mirrored current to the second node.

2. The light emitting element driving apparatus according to claim 1, wherein the switching unit includes a plurality of switches, each of the plurality of switches including a gate to which any corresponding one of the first amplified signals is input, a drain connected to any corresponding one of the output terminals of the light emitting element arrays, and a source connected to the first node.

3. The light emitting element driving apparatus according to claim 2, wherein the amplifying unit includes a plurality of amplifiers, each of the plurality of amplifiers including a first input terminal to which a voltage of the second node is input, a second input terminal to which any corresponding one of the reference voltages is input, and an output terminal for outputting any corresponding one of the first amplified signals.

4. The light emitting element driving apparatus according to claim 1, wherein the current sensing circuit is configured such that the mirrored current is less than the current supplied from the first node.

5. The light emitting element driving apparatus according to claim 1, wherein the current sensing circuit includes:
a first current mirror configured to mirror the current supplied from the first node and to output a primary mirrored current; and
a second current mirror configured to mirror the primary mirrored current and to output a secondary mirrored current.

6. The light emitting element driving apparatus according to claim 5, wherein the primary mirrored current is 1/K times the current supplied from the first node, K being a real number greater than 1.

7. The light emitting element driving apparatus according to claim 6, wherein the secondary mirrored current is equal to the primary mirrored current.

8. The light emitting element driving apparatus according to claim 5, wherein the first current mirror includes:
a first transistor to which the current supplied from the first node is input; and
a second transistor into which the primary mirrored current flows, and
wherein the second current mirror includes:
a third transistor connected to the second transistor, the primary mirrored current flowing into the third transistor; and
a fourth transistor connected to the second node, the secondary mirrored current flowing into the fourth transistor.

9. The light emitting element driving apparatus according to claim 8, wherein the current sensing circuit further includes:
an amplifier configured to generate a second amplified signal according to a result of amplifying a voltage of the first node and a voltage of an output terminal of the first current mirror and to provide the second amplified signal to a gate of the third transistor and a gate of the fourth transistor.

10. The light emitting element driving apparatus according to claim 1, wherein the current sensing circuit includes:
a first current mirror including a first transistor and a second transistor, the first transistor including a first drain connected to the first node, a first source connected to the electrical ground, and a first gate to which the first power source is applied, the second transistor including a second drain, a second source connected to the electrical ground, and a second gate connected to the first gate, the first power source being applied to the second gate;
a second current mirror including a third transistor and a fourth transistor, the third transistor including a third drain connected to the second drain, a third source to which the first power source is applied, and a third gate to which a second amplified signal is applied, the fourth transistor including a fourth drain connected to the second node, a fourth source to which the first power source is applied, and a fourth gate connected to the third gate, the second amplified signal being applied to the fourth gate; and
an amplifier configured to amplify voltages of the first and second drains and to output the second amplified signal according to an amplification result.

* * * * *